United States Patent
Bassilakis (10) Patent No.: US 7,334,632 B2
(45) Date of Patent: Feb. 26, 2008

(54) VARIABLE VOLUMETRIC FLOW HEAT EXCHANGER FOR AN AIR-TO-AIR HEAT RECOVERY SYSTEM

(76) Inventor: Harry C. Bassilakis, 277 Chimneysweap Hill Rd., Glastonbury, CT (US) 06033

( * ) Notice: Subject to any disclaimer, the term of this patent is extended or adjusted under 35 U.S.C. 154(b) by 534 days.

(21) Appl. No.: 10/863,901

(22) Filed: Jun. 8, 2004

(65) Prior Publication Data

US 2005/0268903 A1    Dec. 8, 2005

(51) Int. Cl.
*F24F 3/00* (2006.01)
(52) U.S. Cl. ............................ 165/205; 165/217; 165/4
(58) Field of Classification Search ................ 165/201, 165/205, 212, 217, 4; 62/159, 238.6, 186, 62/187
See application file for complete search history.

(56) References Cited

U.S. PATENT DOCUMENTS

| | | | |
|---|---|---|---|
| 3,058,723 A | 10/1962 | Nilsson et al. | |
| 3,225,819 A | 12/1965 | Stevens | |
| 3,996,759 A * | 12/1976 | Meckler | 62/170 |
| 4,049,404 A | 9/1977 | Johnson | 55/387 |
| 4,165,036 A * | 8/1979 | Meckler | 62/238.6 |
| 4,419,864 A * | 12/1983 | McFarlan | 62/159 |
| 4,559,788 A * | 12/1985 | McFarlan | 62/159 |
| 4,730,461 A * | 3/1988 | Meckler | 62/187 |
| 4,887,438 A * | 12/1989 | Meckler | 62/271 |
| 5,279,609 A * | 1/1994 | Meckler | 165/217 |
| 5,439,048 A | 8/1995 | Osman et al. | 165/4 |
| 6,178,966 B1 | 1/2001 | Breshears | 126/702 |
| RE37,464 E * | 12/2001 | Meckler | 62/271 |
| 6,450,244 B1 | 9/2002 | Bassilakis | 165/4 |

* cited by examiner

*Primary Examiner*—Ljiljana Ciric
(74) *Attorney, Agent, or Firm*—Alix, Yale & Ristas, LLP

(57) ABSTRACT

A variable volumetric flow heat exchanger for a building air-to-air heat recovery system that is operable at a high volumetric flow rate and at a low volumetric flow rate. The heat exchanger includes multiple heat exchange banks, including at least one continuous duty heat exchange bank, and at least one cyclic heat exchange bank. A damper assembly includes at least one damper module having at least one damper reciprocative between open and closed positions. A control system moves the heat exchanger damper to the closed position when the heat recovery system is operated at the low volumetric flow rate and moves the heat exchanger damper to the open position when the heat recovery system is operated at the high volumetric flow rate.

17 Claims, 5 Drawing Sheets

VARIABLE VOLUMETRIC FLOW HEAT EXCHANGER FOR AN AIR-TO-AIR HEAT RECOVERY SYSTEM

BACKGROUND OF THE INVENTION

This invention relates generally to building ventilation systems. More particularly, the present invention relates to building ventilation systems having apparatus for recovering the heat in the air exhausted from the ventilated area.

Ventilating systems are commonly used to maintain indoor environmental standards in industrial buildings, commercial office buildings, schools and farming facilities. Such buildings include foundries, factories, metal finishing areas, work shops, service areas, warehouses, meeting halls, recreational buildings, animal nursery and feeder houses, swimming pools and other facilities of many diverse types. Ventilation systems for such facilities are necessary to remove excess heat, discharge pollutants and unwanted moisture and to maintain a healthful, comfortable environment. Unfortunately, safety, health and economic considerations are at odds with one another in that air, which has been heated or cooled at substantial expense, is virtually thrown away by the conventional ventilation process.

In the case of a heated facility, the exhaust air of the ventilation process contains not only the sensible energy expended in increasing the supply air temperature but the latent energy represented by the vaporized water required to adequately humidify. With great pressure on power-producing utilities and the ever-increasing cost of fuels for heating and cooling, there is a great need to recover thermal energy from the exhaust air of all high performance ventilation systems.

Conventional ventilation thermal energy recovery systems have used rotating wheel heat exchangers as well as non-rotating cross-flow heat exchangers. Heat exchangers of these types have been constructed from metals such as stainless steel and aluminum and from certain ceramics such as aluminum oxide and silicon carbide. Such materials, while structurally sound, are expensive and have little or no capability of storing and releasing moisture not to mention the high maintenance required and lack of ability to provide free cooling when energy is not required to be recovered.

SUMMARY OF THE INVENTION

Briefly stated, the invention in a preferred form is a variable volumetric flow heat exchanger for a building air-to-air heat recovery system that is operable at a high volumetric flow rate and at a low volumetric flow rate. The heat recovery system includes first and second flow passages and at least one damper reciprocative between first and second positions. The first flow passage is in fluid communication with the ventilation system air exhaust line and the second flow passage is in fluid communication with the ventilation system air supply line when the damper is in the first position. The first flow passage is in fluid communication with the ventilation system air supply line and the second flow passage being in fluid communication with the ventilation system air exhaust line when the damper is in the second position. Each of the flow passages includes at least one of the heat exchangers. Each heat exchanger comprises multiple heat exchange banks, including at least one continuous duty heat exchange bank, and at least one cyclic heat exchange bank. A damper assembly includes at least one damper module having at least one damper reciprocative between open and closed positions. A control system moves the heat exchanger damper to the closed position when the heat recovery system is operated at the low volumetric flow rate and moves the heat exchanger damper to the open position when the heat recovery system is operated at the high volumetric flow rate.

Each of the heat exchange banks includes at least one heat exchange module having a heat exchange mass. A flow separators is disposed intermediate adjacent heat exchange banks.

The control system includes at least one actuator. One of the damper modules and one of the actuators is associated with each of the cyclic heat exchange banks. The control system also includes at least one spring associated with each damper module for biasing the at least one heat exchanger damper to the closed position. The actuator is energized to move the heat exchanger damper to the open position.

The control system may further include a flow sensor for sensing the volumetric flow rate. The control system signals the actuator to move the heat exchanger damper to the closed position when the sensed volumetric flow rate drops below a first predetermined value and signals the actuator to move the heat exchanger damper to the open position when the sensed volumetric flow rate rises above a second predetermined value.

The ventilating system fan mean may also controlled by the control system. The control system signals the actuator to move the heat exchanger damper to the closed position when the fan is operated at the low volumetric flow rate and signals the actuator to move the heat exchanger damper to the open position when the fan is operated at the high volumetric flow rate. Alternatively, the control system may signal the actuator to move the heat exchanger damper to the closed position after a fixed time interval from the time the fan is switched from the high volumetric flow rate to the low volumetric flow rate.

In one embodiment, the heat recovery system that is operable at an intermediate volumetric flow rate. The heat exchange banks include first and second cyclic heat exchange banks and the damper assembly includes first and second damper modules associated with the first and second cyclic heat exchange banks, respectively. The heat exchange banks also includes a single continuous duty heat exchange bank. A first flow separator extends between the first cyclic heat exchange bank and the second cyclic heat exchange bank and a second flow separator extends between the second cyclic heat exchange bank and the continuous duty heat exchange bank. The control system moves the heat exchanger damper of the first damper module to the closed position when the heat recovery system is operated at the intermediate volumetric flow rate or the low volumetric flow rate and moves the heat exchanger damper of the first damper to the open position when the heat recovery system is operated at the high volumetric flow rate. The control system moves the heat exchanger damper of the second damper module to the closed position when the heat recovery system is operated at the low volumetric flow rate and moves the heat exchanger damper of the second damper to the open position when the heat exchanger system is operated at the intermediate volumetric flow rate or the high volumetric flow rate.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

With reference to the drawings wherein like numerals represent like parts throughout the several figures, a variable volumetric flow heat exchanger 10, 10' in accordance with the present invention is used in an air-to-air heat recovery system 12 of the type disclosed in U.S. Pat. No. 6,450,244, herein incorporated by reference. Such air-to-air heat recovery systems 12 are reverse flow designs, requiring the use of identical, first and second heat exchangers 10, 10'. Each of the heat exchangers 10, 10' is composed of one or more heat exchange modules 14, depending on the required heat recovery capacity. The first and second heat exchangers 10, 10' are combined with one or more damper modules 16 depending on the location of the installation. Conventional ducting is used to connect the modules together and/or to the building ventilation system where necessary.

Each heat exchange module 14 includes a heat exchange mass 17 disposed within a rectangular-shaped housing 18. Each damper module 16 includes a damper 20 disposed within a rectangular-shaped frame 22 and a damper control system 24. A cover 26 is mounted to the top of the frame 22 and the frame 22 is mounted to a base 28, forming a housing having four sides 30, 32, 34, 36. For the single damper module 16 shown in FIGS. 1 and 2, all four sides 30, 32, 34, 36 are open and define a port. The first heat exchanger 10 is connected to the third side 34 of the damper module 16 and the second heat exchanger 10' is connected to the fourth side 36 of the damper module 16. If the installation allows, the heat exchangers 10, 10' may be connected directly to the damper module 16. Alternatively, the heat exchangers 10, 10' may be connected to the damper module 16 by a section of duct. The building ventilation exhaust line 35 is connected to the first side 30 of the damper module 16 and the building ventilation supply line 37 is connected to the second side 32 of the damper module 16.

During the first half of the operating cycle, the damper 20 is positioned at a first position 38, such that the air discharged from the ventilation exhaust duct must travel through the first heat exchanger 10 before it is finally exhausted to the outside. As the air travels through the first heat exchanger 10, the heat energy in the air (both sensible and latent) is absorbed by the heat exchange plates comprising the heat exchange mass of the heat exchange module(s) 14 which are cool relative to the outgoing air. It should be appreciated that for the subject heat exchanger, both sensible heat energy and latent heat energy is exchanged and the term "heat energy" when used below will be understood to include both sensible and latent heat energy. Outside air that is drawn into the ventilation supply line must travel through the second heat exchanger 10' before it enters the ventilation supply duct. The heat energy that had been absorbed by the heat exchange plates in the second half of the previous operating cycle is absorbed by the incoming air which is cool relative to the heat exchange plates.

After a predetermined period of time (generally about seventy (70) seconds), the damper 20 is reciprocated to a second position 40 thereby changing the air flow path through the damper module 16. During the second half of the operating cycle, the air discharged from the ventilation exhaust line must travel through the second heat exchanger 10' before it is finally exhausted to the outside. As the air travels through the second heat exchanger 10', the heat energy in the air is absorbed by the heat exchange plates of the heat exchange module(s) 14 which had just been cooled by the flow of incoming air in the first half of the operating cycle. Outside air that is drawn into the ventilation supply line must travel through the first heat exchanger 10 before it enters the ventilation supply duct. Heat energy that had been absorbed by the heat exchange plates in the first half of the operating cycle is absorbed by the incoming air which is cool relative to the plates.

After the predetermined period of time has again elapsed, the damper 20 is reciprocated to the first position 38 thereby initiating the first half of the next cycle. Alternating the two heat exchangers 10, 10' between the ventilation exhaust line and the ventilation supply line allows the heat in the outgoing air to be recovered, stored, and returned to the incoming air.

In cold, winter weather, moisture in the exhaust air condenses on the heat exchange plates. It should be appreciated that such condensation does not occur uniformly throughout the heat exchanger. Rather, localized areas of condensate are formed. When the ventilation system is being operated at the full rated volumetric flow rate, the short time period between the two halves of the cycle is sufficient to fully transfer the heat energy of the outgoing air flow while limiting the cooling by the incoming air flow such that the accumulation of condensate on the heat exchange plates is limited and the condensate is not allowed to freeze.

However, when the ventilation system is operated at a reduced volumetric flow rate (e.g. at night when the building is not occupied), the reduced force of the ventilation fans is not sufficient to maintain a uniform flow of air through the entire heat exchanger under these conditions. That is, the flow resistance of the localized areas of condensate causes a portion of the outgoing air flow to bypass the vicinity of the condensate. This reduces the volumetric flow rate of the outgoing air flow in the vicinity of the areas of condensate, as compared to the volumetric flow rate of the outgoing air flow in areas of the heat exchanger where condensate has not started to accumulate. The heat input from the outgoing air flow to the heat exchange plates in the vicinity of the areas of condensate is proportionally reduced. Consequently, the heat exchange plates in the vicinity of the condensate remain cold. When the damper changes position and cold outside air is drawn into the heat exchanger, incoming air removes some of the condensate but further chills the remaining condensate and the heat exchange plates in the vicinity of the areas of condensate, causing the condensate to freeze and form patches of ice.

When the damper changes position and the building air is again exhausted through the heat exchanger, the flow resistance of the ice patches causes a portion of the outgoing air flow to bypass the vicinity of the ice patches. As described above, the heat input from the outgoing air flow to the heat exchange plates in the vicinity of the ice patches is thereby reduced and the airborne moisture in the exhaust air preferentially condenses on the ice patches and the heat exchange plates in the vicinity of the ice patches. When the damper changes position and cold outside air is drawn into the heat exchanger, the incoming air again removes some of the liquid condensate but also freezes the remaining condensate, increasing the size of the ice patch. This cycle of growth continues until the volumetric flow through the portions of the heat exchanger that are not choked with ice is sufficiently great to prevent further development of ice within the heat exchanger. It should be appreciated that the ice deposits have a severe negative impact on the performance of the air-to-air heat recovery system when the ventilation system is returned to full operation.

To prevent ice formation within the heat exchanger and maintain the efficiency of the heat transfer during low volumetric flow operations, a variable volumetric flow heat exchanger 10, 10' in accordance with the invention is separated into two or more heat exchange banks 42, 44. Each heat exchange bank 42, 44 includes one or more heat exchange module 14. A damper assembly 46 mounted at the exhaust/intake 48 of each heat exchanger 10, 10' includes at least one damper module 49 having at least one damper 50 that may be actuated to block air flow through a corresponding "cyclic" heat exchange bank 42 when the ventilating system fans are operated below full capacity. The number of heat exchange modules 14 in the unblocked "continuous duty" heat exchange bank 44 are selected to ensure that the air flow through the continuous duty heat exchange bank 44 is sufficiently high that the heat exchange plates of the continuous duty heat exchange bank 44 are fully defrosted by the outgoing air flow. In addition, channeling the reduced air flow through a reduced number heat exchange plates maintains the efficiency of the heat exchange process. For example, the number of heat exchange modules 14 in the continuous duty heat exchange bank 44 may be selected such that the volumetric flow rate through the continuous duty heat exchange bank 44 is substantially equal to the volumetric flow rate through the heat exchanger 10, 10' when the ventilation system fans are operated at full capacity. Flow separators 52 are positioned between the heat exchange banks 42, 44 to prevent air from flowing from the continuous duty heat exchange bank 44 into the blocked cyclic heat exchange banks 42.

Figure 1:
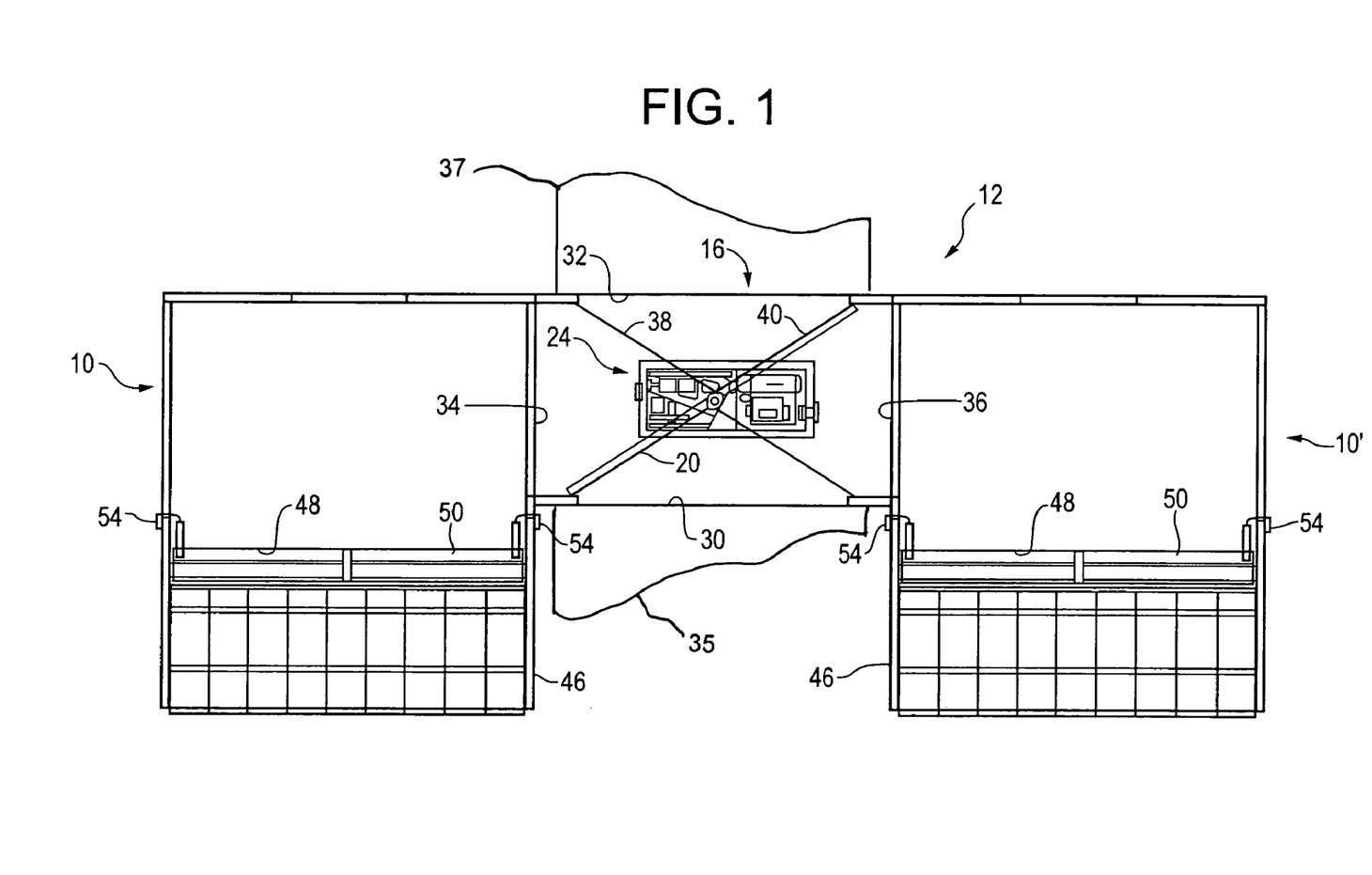
FIG. 1 is a plan view of an air-to-air heat recovery system having a first embodiment of a variable volumetric flow heat exchanger in accordance with the invention.
Figure 2:
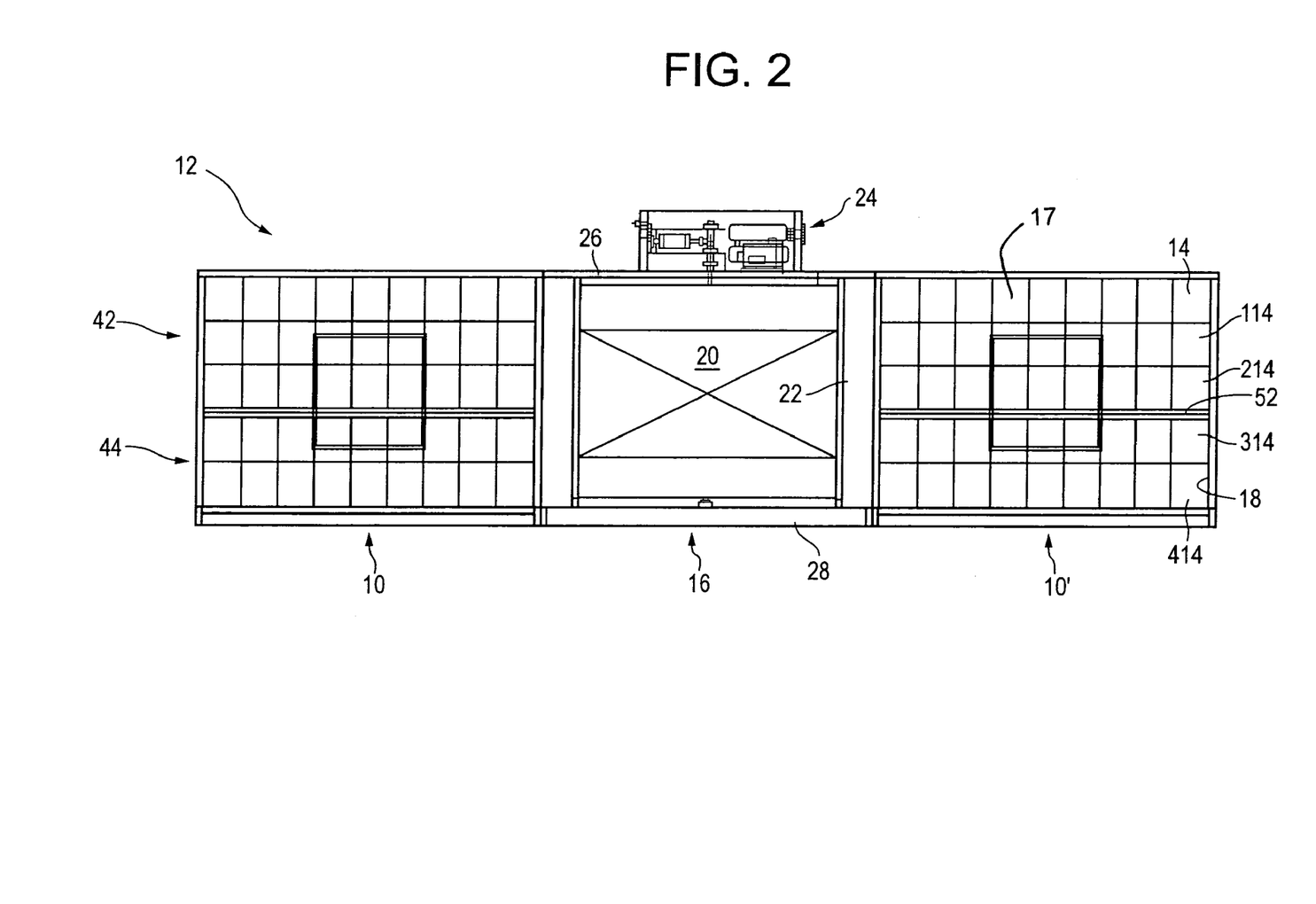
FIG. 2 is an elevation view of the air-to-air heat recovery system of FIG. 1.
Figure 3:
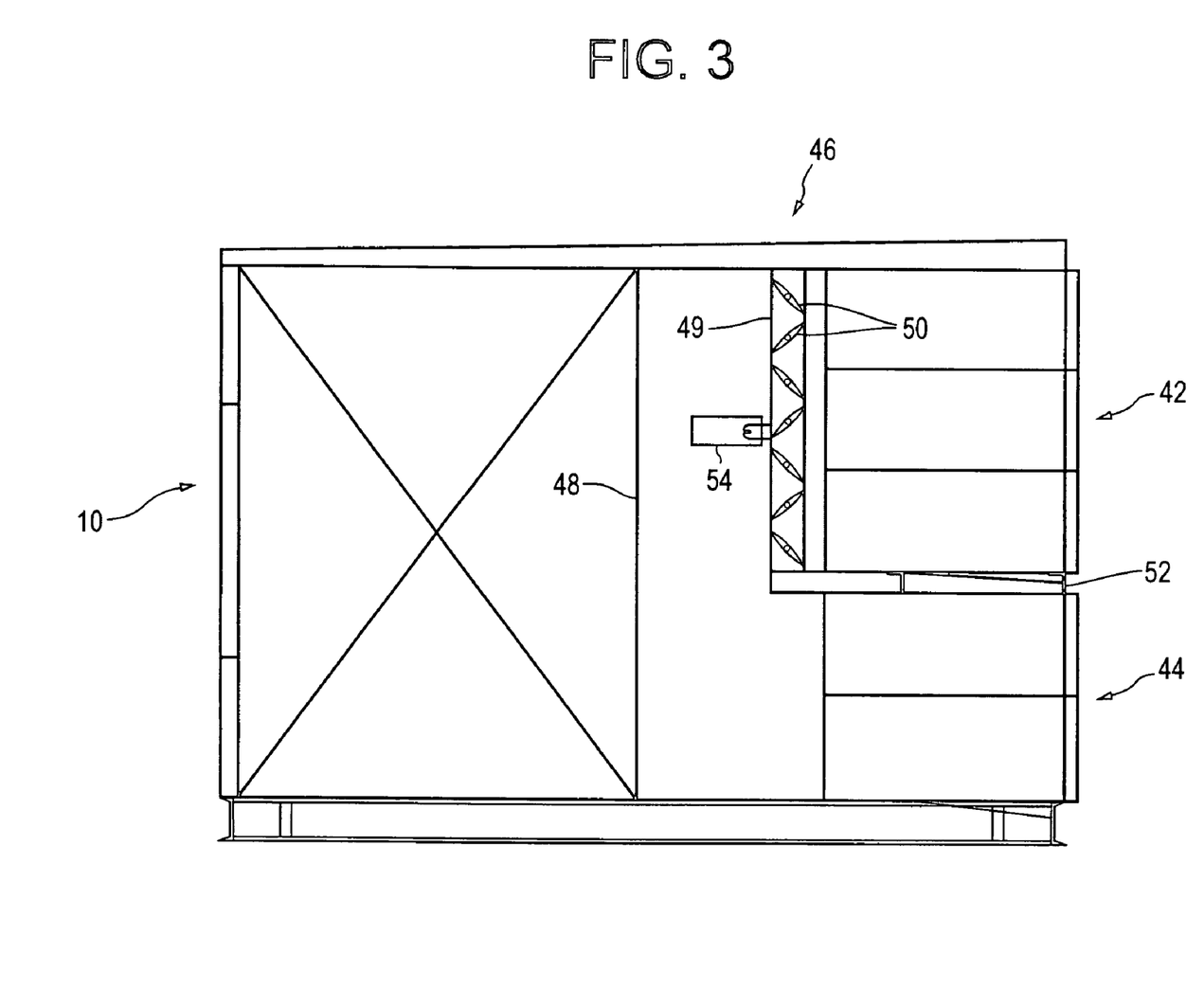
FIG. 3 is a side view of the air-to-air heat recovery system of FIG. 1.

In the embodiment of FIGS. 1-3, each heat exchanger 10, 10' includes five heat exchange modules 14, 114, 214, 314, 414 that are divided into a single cyclic heat exchange bank 42, comprising the top three heat exchange modules 14, 114, 214, and the continuous duty heat exchange bank 44, comprising the bottom two heat exchange modules 314, 414, with a single flow separator 52 extending between the cyclic heat exchange bank 42 and the continuous duty heat exchange bank 44. Actuators 54 mounted on the sides of each damper assembly 46 are actuated to open the associated damper assembly dampers 50. Preferably, the actuators 54 are 24 volt AC actuators, for example BELIMO™ AF-24 actuators. The dampers 50 are spring loaded to close when the actuator 54 is no longer energized.

Figure 6:
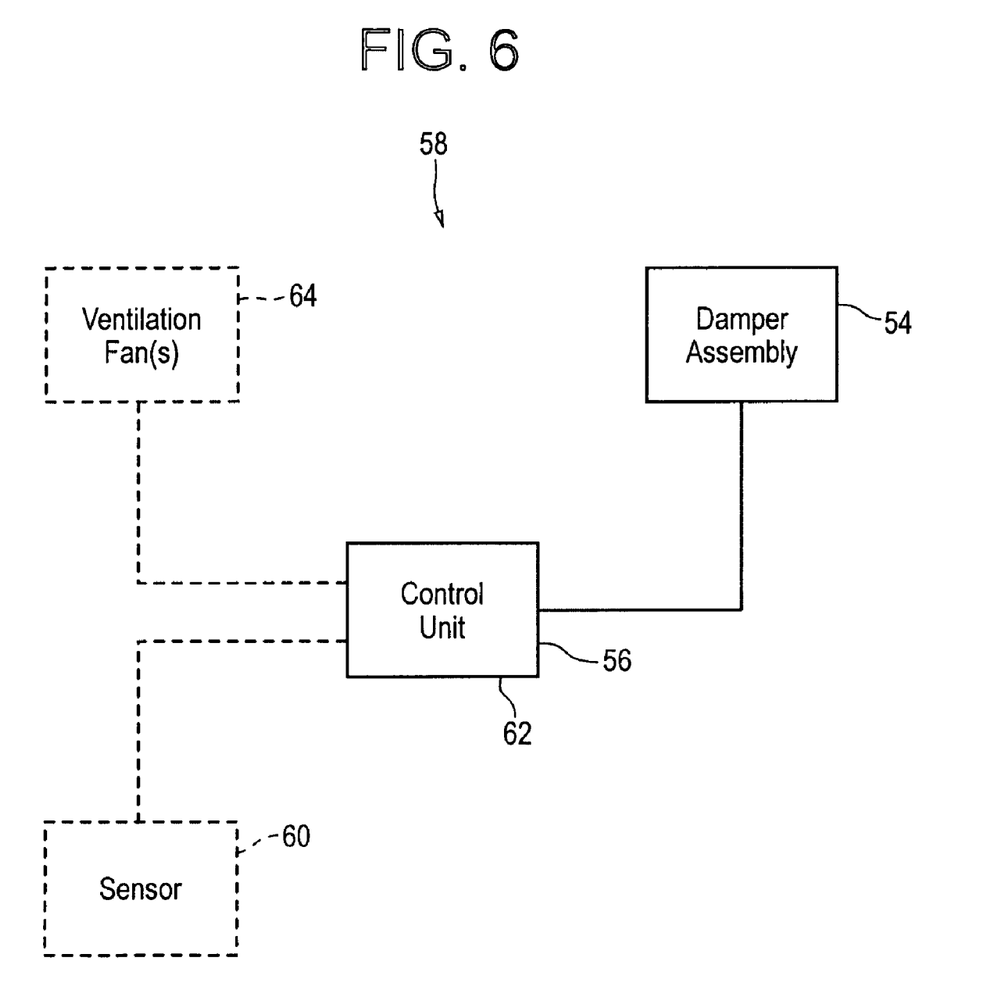
FIG. 6 is a schematic view of the damper assembly control system.

With reference to FIG. 6, the actuator 54 is actuated by a control unit 56 to open the damper assembly dampers 50. The damper assembly control system 58 may also include a flow sensor 60 for sensing the ventilation flow rate. When the ventilation system is switched to a reduced volumetric flow rate, the sensed ventilation flow rate drops below a predetermined value and the control unit 56 de-energizes the actuator 54, allowing the damper assembly dampers 50 to close. When the ventilation is returned to the rated volumetric flow rate, the sensed ventilation flow rate will rise above a predetermined value and the control unit 56 energizes the actuator 54 to open the damper assembly dampers 50. Alternatively, the ventilation system control unit and damper assembly control system control unit 56 may comprise a single control unit 62. In this mode of operation, the control unit 62 may de-energize the actuator 54 when it switches the ventilation system to a reduced volumetric flow rate. Alternatively, the control unit 62 may de-energize the actuator 54 a fixed period of time after it switches the ventilation system to a reduced volumetric flow rate, to allow for coast down of the ventilation fan(s) 64.

Figure 4:
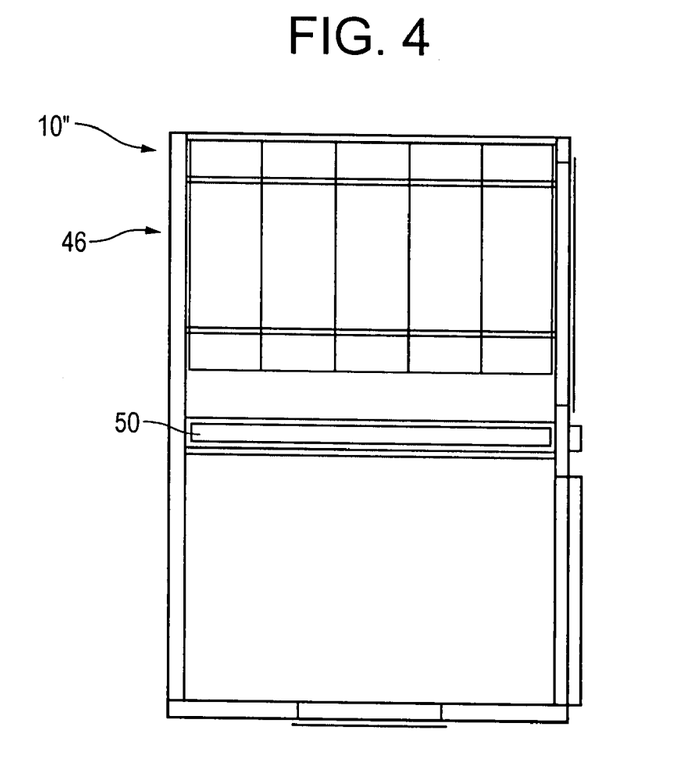
FIG. 4 is a plan view of a second embodiment of a variable volumetric flow heat exchanger in accordance with the invention.
Figure 5:
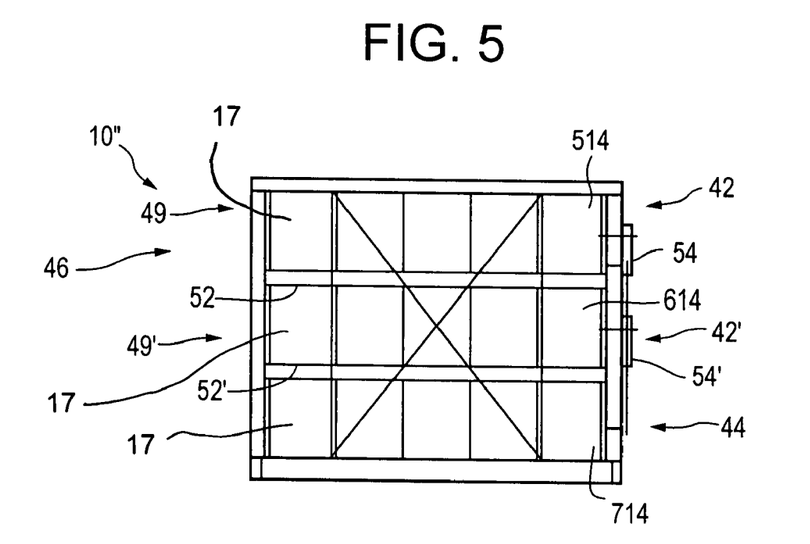
FIG. 5 is an elevation view of the heat exchanger of FIG. 4.

In the embodiment of FIGS. 4 and 5, each heat exchanger 10" includes three heat exchange modules 514, 614, 714 that are divided into a first cyclic heat exchange bank 42, comprising the top heat exchange module 514, a second cyclic heat exchange bank 42', comprising the middle heat exchange module 614, and the continuous duty heat exchange bank 44, comprising the bottom heat exchange module 714, with a flow separator 52 extending between the first cyclic heat exchange bank 42 and the second cyclic heat exchange bank 42' and a flow separator 52' extending between the second cyclic heat exchange bank 42' and the continuous duty heat exchange bank 44. First and second actuators 54, 54' mounted on the side of first and second damper modules 49, 49', are actuated to open the damper assembly dampers 50 for the associated cyclic heat exchange bank 42, 42'.

Multiple cyclic heat exchange banks 42 may be used where the ventilation system requires greater flexibility with respect to operation of the air-to-air heat recovery system. For example, the heat exchangers 10" of FIGS. 4 and 5 may be used where ventilation system is operated at the rated volumetric flow during normal working hours, at a partially reduced volumetric flow rate when office and support staff have left but a second manufacturing shift is working, and at a fully reduced volumetric flow rate when the second manufacturing shift has left. It should be appreciated that the modularity of the heat exchange modules 14 and the damper assemblies 46 allows great flexibility in customizing operation of the air-to-air heat recovery system to the operation of the ventilating system.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A variable volumetric flow heat exchange system for a building air-to-air heat recovery system operable at first and second volumetric flow rate, the first volumetric flow rate being greater than the second volumetric flow rate, the building having a ventilation system including an air exhaust line for discharging stale air from inside the building and an air supply line for receiving fresh air from the outside the building, the heat recovery system including first and second flow passages and at least one ventilation system damper reciprocative between first and second positions, each of the flow passages including at least one heat exchanger, the first flow passage being in fluid communication with the ventilation system air exhaust line and the second flow passage being in fluid communication with the ventilation system air supply line when the ventilation system damper is in the first position, and the first flow passage being in fluid communication with the ventilation system air supply line and the second flow passage being in fluid communication with the ventilation system air exhaust line when the ventilation system damper is in the second position, each heat exchanger comprising:
  a plurality of heat exchange banks, including
    at least one continuous duty heat exchange bank, and
    at least one cyclic heat exchange bank;
  a damper assembly including
    at least one damper module having at least one damper reciprocative between open and closed positions, and
    a control system for moving the at least one heat exchanger damper to the closed position when the heat recovery system is operated at the second volumetric flow rate and for moving the heat exchanger damper to the open position when the heat recovery system is operated at the first volumetric flow rate.

2. The heat exchanger of claim 1 wherein each of the heat exchange banks includes at least one, heat exchange module, each heat exchange module having a heat exchange mass.

3. The heat exchanger of claim 1 further comprising at least one flow separator, disposed intermediate adjacent heat exchange banks.

4. The heat exchanger of claim 1 wherein the control system includes at least one actuator, each of the cyclic heat exchange banks being associated with one of the damper modules and one of the actuators.

5. The heat exchanger of claim 4 wherein the at least one heat exchanger damper is biased to the closed position, the actuator being energized to move the at least one heat exchanger damper to the open position.

6. The heat exchanger of claim 5 wherein the control system further includes a flow sensor for sensing the volumetric flow rate, the control system energizing the actuator of the at least one heat exchanger damper when the sensed volumetric flow rate drops below a first predetermined value and de-energizing the actuator of the at least one heat exchanger damper when the sensed volumetric flow rate rises above a second predetermined value.

7. The heat exchanger of claim 1 wherein the plurality of heat exchange banks includes a first and second cyclic heat exchange banks and the damper assembly includes first and second damper modules associated with the first and second cyclic heat exchange banks, respectively.

8. The heat exchanger of claim 7 wherein the plurality of heat exchange banks also includes a single continuous duty heat exchange bank and the heat exchanger also comprises a first flow separator extending between the first cyclic heat exchange bank and the second cyclic heat exchange bank and a second flow separator extending between the second cyclic heat exchange bank and the continuous duty heat exchange bank.

9. The heat exchanger of claim 7 wherein the control system includes first and second actuators mounted on the first and second damper modules, respectively, for moving the associated heat exchanger dampers to the open position.

10. The heat exchanger of claim 9 wherein the at least one heat exchanger damper is biased to the closed position.

11. An air-to-air heat recovery system for a building defining an inside and an outside, the heat recovery system comprising:
  a ventilation system including
    an air exhaust line for discharging stale air from inside the building,
    an air supply line for receiving fresh air from the outside the building, and
    a fan for driving air into the air supply line and out of the air exhaust line, the fan being operable at first and second volumetric flow rates, the first volumetric flow rate being greater than the second volumetric flow rate;
  first and second flow passages;
  at least one ventilation system damper reciprocative between first and second positions, the first flow passage being in fluid communication with the air exhaust line and the second flow passage being fluid communication with the air supply line when the ventilation system damper is in the first position, and the first flow passage being in fluid communication with the air supply line and the second flow passage being fluid communication with the air exhaust line when the ventilation system damper is in the second position; and
  a plurality of heat exchangers, at least one of the heat exchangers being disposed in each of the flow passages, each of the heat exchangers comprising
    a plurality of heat exchange banks, including
      at least one continuous duty heat exchange bank, and
      at least one cyclic heat exchange bank;
    a damper assembly including
      at least one damper module having at least one damper reciprocative between open and closed positions, and
      a control system for moving the at least one heat exchanger damper to the closed position when the fan is operated at the second volumetric flow rate and for moving the heat exchanger damper to the open position when the fan is operated at the first volumetric flow rate.

12. The heat recovery system of claim 11 wherein
the fan is also operable at a third volumetric flow rate the third volumetric flow rate being intermediate the first and second volumetric flow rates;
the plurality of heat exchange banks includes a first and second cyclic heat exchange banks;
the damper assembly includes first and second damper modules associated with the first and second cyclic heat exchange banks, respectively; and
the control system moves the at least one heat exchanger damper of the first damper module to the closed position when the fan is operated at the third volumetric flow rate or the second volumetric flow rate and moves the at least one heat exchanger damper of the first damper module to the open position when the fan is operated at the first volumetric flow rate, and the control system moves the at least one heat exchanger damper of the second damper module to the closed position when the fan is operated at the second volumetric flow rate and moves the at least one heat exchanger damper of the second damper module to the open position when the fan is operated at the third volumetric flow rate or the first volumetric flow rate.

13. The heat exchanger of claim 11 wherein the control system includes at least one actuator, each of the cyclic heat exchange banks being associated with one of the damper modules and one of the actuators.

14. The heat exchanger of claim 13 wherein the control system also includes a flow sensor for sensing the volumetric flow rate, the control system signaling the actuator to move the at least one heat exchanger damper to the closed position when the sensed volumetric flow rate drops below a first predetermined value and signaling the actuator to move the at least one heat exchanger damper to the open position when the sensed volumetric flow rate rises above a second predetermined value.

15. The heat recovery system of claim 13 wherein the fan is also controlled by the control system, the control system signaling the actuator to move the at least one heat exchanger damper to the closed position when the fan is operated at the second volumetric flow rate and signaling the actuator to move the at least one heat exchanger damper to the open position when the fan is operated at the first volumetric flow rate.

16. The heat recovery system of claim 13 wherein the fan is also controlled by the control system, the control system signaling the actuator to move the at least one heat exchanger damper to the closed position after a fixed time interval from the time the fan is switched from the first volumetric flow rate to the second volumetric flow rate and signaling the actuator to move the at least one heat exchanger damper to the open position when the fan is switched from the second volumetric flow rate to the first volumetric flow rate.

17. A variable volumetric flow heat exchange system for a building air-to-air heat recovery system operable at first and second volumetric flow rate, the first volumetric flow rate being greater than the second volumetric flow rate, the building having a ventilation system including an air exhaust line for discharging stale air from inside the building and an air supply line for receiving fresh air from the outside the building, the heat recovery system including first and second flow passages and at least one ventilation system damper reciprocative between first and second positions, each of the flow passages including at least one heat exchanger, the first flow passage being in fluid communication with the ventilation system air exhaust line and the second flow passage being fluid communication with the ventilation system air supply line when the ventilation system damper is in the first position, and the first flow passage being in fluid communication with the ventilation system air supply line and the second flow passage being fluid communication with the ventilation system air exhaust line when the ventilation system damper is in the second position, each heat exchanger comprising:
  a plurality of heat exchange banks, including
    at least one continuous duty heat exchange bank, and
    at least one cyclic heat exchange bank;
  at least one flow separator, a one of the flow separators being disposed intermediate adjacent heat exchange banks;
  a damper assembly including
    a damper module associated with each of the cyclic heat exchange banks, each damper module having at least one damper reciprocative between open and closed positions, the at least one heat exchanger damper being biased to the closed position when the heat recovery system is operated at the second volumetric flow rate and
  a control system including at least one actuator associated with each damper module, the actuator being energized to move the at least one heat exchanger damper to the open position when the heat recovery system is operated at the first volumetric flow rate.

* * * * *

UNITED STATES PATENT AND TRADEMARK OFFICE
CERTIFICATE OF CORRECTION

PATENT NO. : 7,334,632 B2  
APPLICATION NO. : 10/863901  
DATED : February 26, 2008  
INVENTOR(S) : Bassilakis Page 1 of 1

It is certified that error appears in the above-identified patent and that said Letters Patent is hereby corrected as shown below:

<u>Column 6</u>:

Line 52, delete "rate," and substitute --rates,--.

<u>Column 8</u>:

Line 33, after "rate" insert --,--.

<u>Column 9</u>:

Line 21, delete "rate," and substitute --rates,--.

<u>Column 10</u>:

Line 23, after "rate" insert --,--.

Signed and Sealed this

Third Day of June, 2008

JON W. DUDAS  
*Director of the United States Patent and Trademark Office*